E. R. HALL.
Horse Hay-Rake.
No. 78,735.    Patented June 9, 1868.
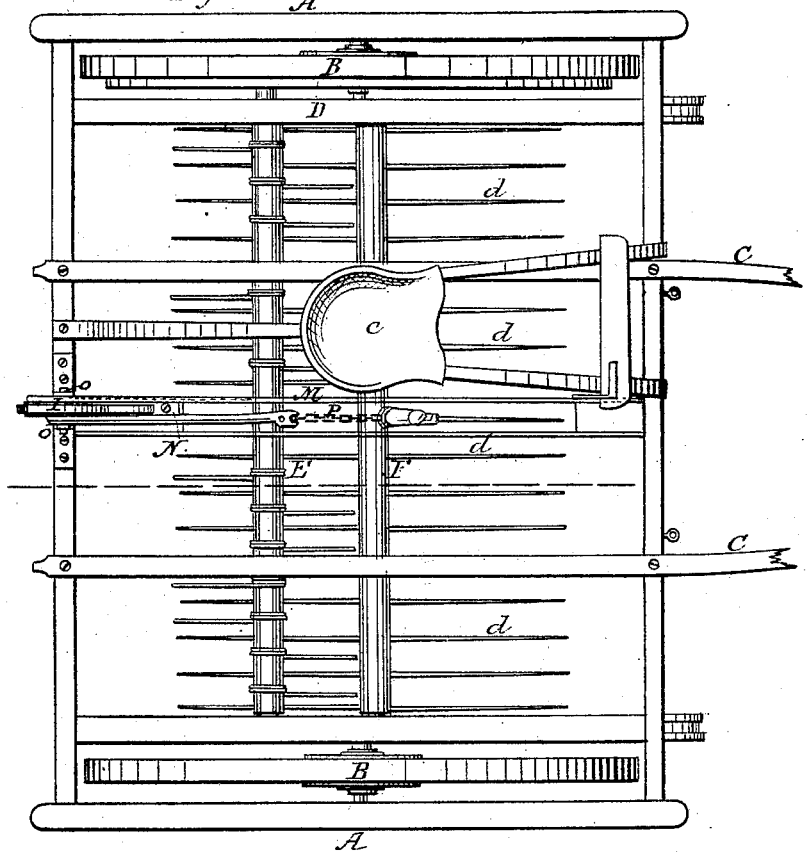

United States Patent Office.

E. R. HALL, OF UTICA, NEW YORK, ASSIGNOR TO HIMSELF, D. M. GOLDEN, AND B. G. EATON.

Letters Patent No. 78,735, dated June 9, 1868.

IMPROVEMENT IN HORSE-HAY-RAKES.

*The Schedule referred to in these Letters Patent and making part of the same.*

TO ALL WHOM IT MAY CONCERN:

Be it known that I, E. R. HALL, of Utica, in the county of Oneida, and State of New York, have invented certain new and useful Improvements in Hay-Rakes; and I do hereby declare that the following is a full, clear, and exact description thereof, reference being had to the accompanying drawings, and to the letters of reference marked thereon, which form a part of this specification, in which—

Figure 1 is a plan view, and

Figure 2 a side elevation.

The nature of this invention consists, first, in operating the revolving rake by means of certain devices, the peculiar arrangement of which will be hereinafter fully explained; further, in the employment of a revolving device in the rear of the rake, for scattering the hay, and thus better prepare it for curing or drying.

In order to enable others skilled in the art to make and use my invention, I will now describe its construction and operation.

A represents the frame, to which are attached the wheels B B', shafts C, and driver's seat $c$. Wheel B' is provided with the annular wheel D, the cogs of which are on its under side, as seen in fig. 2. $a\ a$ represent two supports, which are well secured to the under side pieces of frame A. The lower portion of these supports are provided with bearings for revolving shaft E, and also with hinged or sliding boxes, in order that said shaft may be taken off and put on whenever occasion requires. The shaft E is furnished with the hypocycloidal wheel $b$, which gears into annular wheel D. $e\ e$ represent a number of cleaners, or device for scattering the hay, which are so secured and bent around shaft E, that every fourth one will point in the same direction. Each of these cleaners is so located as to sweep between the teeth of the rake, hereinafter described, and should be made of stout steel wire. F represents the rake, furnished with teeth $d\ d\ d$. G are two metal brackets, firmly secured at the front of the inner side pieces of frame A. Between the sides of each one of these brackets are pivoted the arms $g\ g$. The lower ends of said arms are so attached to the ends of rake F as to allow it to revolve when necessary. $h$ represents a metal stop, secured at the centre of the shaft of rake F, and is furnished with projections $i\ i$, as shown in fig. 2. The object of this stop will be fully explained hereafter. H represents an excavated or hollow lever, its lower end being divided so as to stand upon each side of stop $h$. Two metal bands pass around the circular groove, in shaft of rake F, and are then secured to each of the divisions or sides of the lever H, thus permitting the rake to revolve freely. $k$ indicates a spring-stop, fastened to lever H, its lower end resting on projection $i$, as shown in fig. 2. $m$ is a lever, pivoted on the inside of lever H, with its fulcrum at $x$. $n$ is also a lever, pivoted likewise in or between the sides of lever H, its upper end extending a little above the lower end of lever $m$, and its fulcrum being at $x'$. The lower portion of lever $n$ is slightly outward, so that its end will rest upon projection $i$, on the opposite side from spring-stop $k$. The object of this arrangement will now be apparent in the operation of the machine. I represents a ratchet-wheel, with projections cast on one side to receive hand-lever M. This ratchet-wheel is fixed rigidly upon an axle, which has its bearings in uprights $o\ o$. N is also a lever, which is secured firmly to axle of ratchet-wheel I, on the opposite side from lever M. $p$ is a chain, that connects the end of lever N to lever H by means of hook $q$ and staple $q'$. S represents a pawl, pivoted at its lower end in bracket $s$. P is a connecting-rod, one end of which is attached to pawl S, and the other to foot-lever T, said lever being pivoted to the central frame A, and so shaped as to be operated by the driver's foot.

The operation of my invention is as follows: When it is desired to scatter the hay for drying or curing, the shaft E is adjusted to its place. The rake is now elevated to a sufficient height to prevent it from working, and is retained in this position by means of pawl S. The machine may now be driven over the new-mown hay, causing the shaft E to be revolved rapidly, and by means of the cleaners attached thereto the hay will be scattered, thus facilitating the drying process. When it has sufficiently cured, the shaft E is removed and the rake lowered to its proper position. When, in its progress, the rake has gathered itself full of hay, the driver presses upon lever H, which acts upon lever $n$; thus disengages the projections $i\ i$. The rake instantly revolves, and deposits the hay in one spot. It will be observed that as the stop $h$ revolves through the slot in lever H, it presses the spring-stop $k$ out until the projections $i\ i$ reach the bottom of spring-stop, when said stop $k$ immediately resumes its natural position, and thus prevents back action of the rake. It will also be seen that the operator has complete and instant control over the workings of this machine. The foot-lever enables him to withdraw the pawl from the ratchet-wheel, thus allowing the rake to fall in proper position, while, by means of the hand-lever, its workings may be instantly suspended.

Having thus described my invention, what I claim as new, and desire to secure by Letters Patent, is—

1. Levers $m$ and $n$, in combination with stop $h$, substantially as and for the purpose specified.

2. Main lever H, constructed and operating in connection with rake-shaft F, substantially as set forth.

3. The combination of levers $m$ and $n$ with lever H, substantially as described.

4. The employment, in a horse hay-rake, of foot-lever T, in combination with pawl S and connecting-rod P, substantially as and for the purpose specified.

In testimony that I claim the foregoing as my own, I affix my signature, in presence of two witnesses.

E. R. HALL.

Witnesses:
    T. H. ALEXANDER,
    B. G. EATON.